United States Patent [19]

Sexton et al.

[11] Patent Number: 4,854,743
[45] Date of Patent: Aug. 8, 1989

[54] REAR SEAL ASSEMBLY FOR A CHAMBER HOLDING A PARTIALLY FROZEN BEVERAGE

[75] Inventors: Rodney N. Sexton, Laguna Hills; Floyd S. Woolf, Lake Matthews; Timothy W. Ruud, Laguna Hills, all of Calif.

[73] Assignee: ICEE USA Corporation, Anaheim, Calif.

[21] Appl. No.: 192,236

[22] Filed: May 9, 1988

[51] Int. Cl.[4] .................. F16C 33/74; F16C 33/76; F16C 43/00
[52] U.S. Cl. .......................... 384/130; 277/93.5 D; 384/150; 384/481; 384/540
[58] Field of Search ............... 384/130, 142, 149–153, 384/477, 479, 481–483, 537, 540; 277/93.5 D, 93 R, 87; 366/325, 244, 247, 249, 251; 99/275, 348

[56] References Cited

U.S. PATENT DOCUMENTS

| | | |
|---|---|---|
| 2,393,260 | 1/1946 | Pardee .................................. 384/481 |
| 2,556,510 | 6/1951 | Topping . |
| 2,995,391 | 8/1961 | Snyder ........................... 277/93 R X |
| 3,108,449 | 10/1963 | Lents . |
| 3,180,104 | 4/1965 | Goetz . |
| 3,403,524 | 10/1968 | Mitchell et al. . |
| 3,529,748 | 9/1970 | Mitchell et al. . |
| 3,545,063 | 12/1970 | Mitchell . |
| 3,545,829 | 12/1970 | Stoll et al. ........................... 384/481 |
| 3,591,051 | 7/1971 | Mitchell et al. ....................... 222/56 |
| 3,797,268 | 3/1974 | Garavelli ............................... 62/258 |
| 3,823,571 | 7/1974 | Smith et al. ........................... 62/136 |
| 4,093,055 | 6/1978 | Blackburn et al. ................. 192/116.5 |
| 4,171,819 | 10/1979 | Martineau ....................... 277/93 R X |
| 4,406,462 | 9/1983 | Witten ............................. 277/93 SD |

*Primary Examiner*—Thomas R. Hannon
*Attorney, Agent, or Firm*—Steele, Gould & Fried

[57] ABSTRACT

The present invention includes a rear seal assembly that holds and seals a rotatable shaft extending through the cooling chamber and extending axially outboard through a rear wall in the cooling chamber. In the interior of the cooling chamber, the seal assembly includes a first resilient seal having a coupling section fitted about the shaft and a radially protruding lip section at the base of the coupling section. At the axially outboard end portion of the seal housing, an axially outboard male threaded extension protrudes from a wall abutment surface of the seal housing. The outboardly extending male threaded extension of the seal housing mates with complementary threads in the hole through the rear wall of the cooling chamber. A retaining ring, that is metal in the preferred embodiment, is threaded from the outside of the chamber onto the outwardly extending male threaded extension of the seal housing. The retaining ring has a threaded outer circumference. A bearing housing, that is metal in the preferred embodiment, is threadably mounted on the retaining ring. The bearing housing holds, in a partial bore, a ball bearing assembly that holds the shaft.

15 Claims, 2 Drawing Sheets

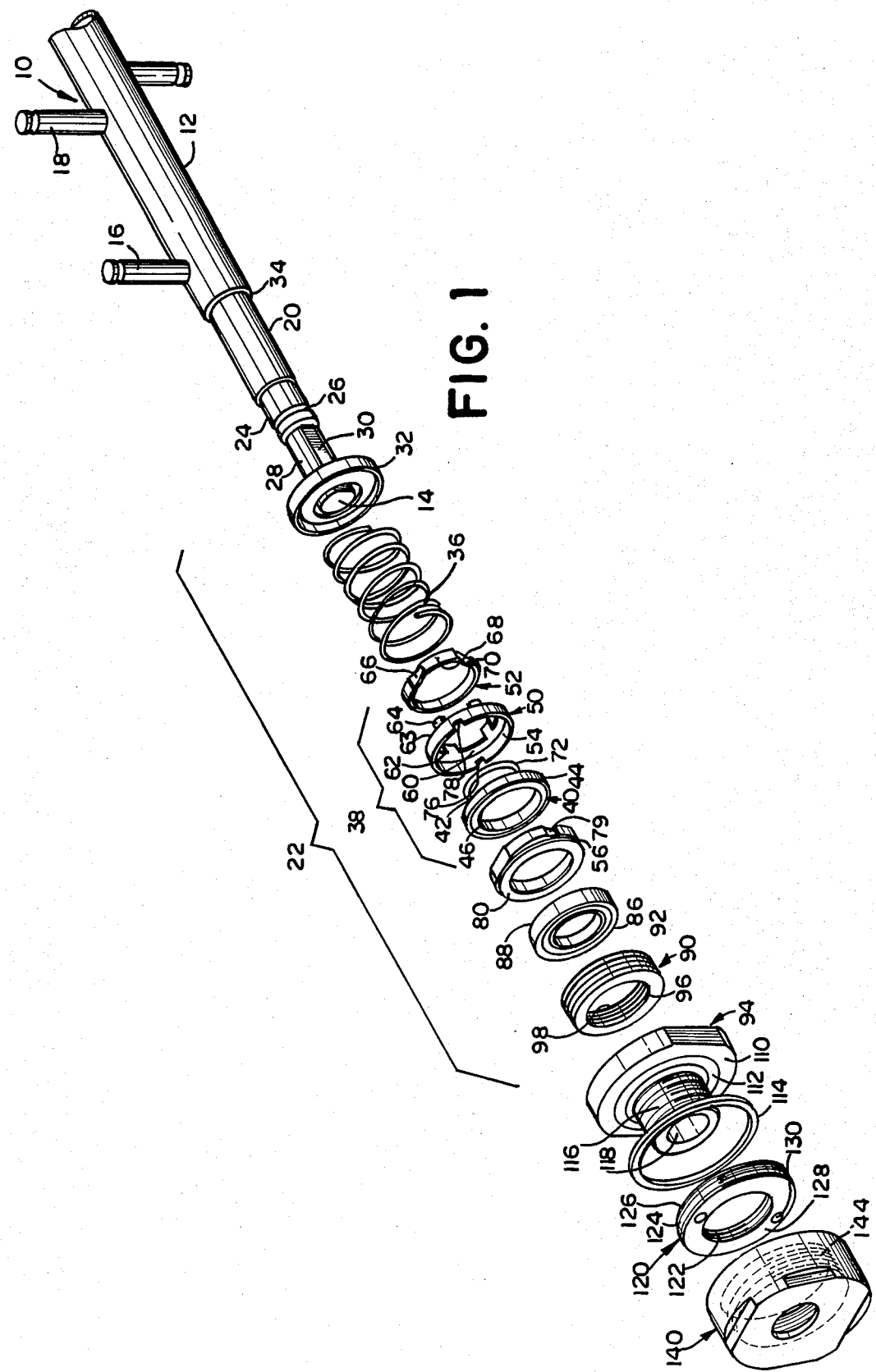

REAR SEAL ASSEMBLY FOR A CHAMBER HOLDING A PARTIALLY FROZEN BEVERAGE

BACKGROUND OF THE INVENTION

The present invention relates to a rear seal assembly for a shaft which passes through a rear wall of a cooling chamber holding a partially frozen beverage.

One method of producing a partially frozen beverage involves cooling a mixture of syrup, water and $CO_2$ while continually mixing the liquid. As the temperature approaches the freezing point, the mixture turns to a slush. In order to inhibit solidification of the mixture, the mixture is continually agitated or mixed. This mixing is accomplished by agitator paddles that are connected to a shaft. The shaft generally extends through the axial length of the elongated, cylindrically shaped cooling chamber. The shaft is rotated by a motor that is spaced from the cooling chamber. The chamber must be sealed, except for a beverage input line and a dispensing valve at the front end of the cooling chamber which dispenses the partially frozen beverage, and hence the shaft must be sealed to prohibit contamination of the beverage from the ambient environment or leakage of the beverage from the chamber.

One prior art rear seal assembly includes a plastic rear seal housing and short stub shaft extending therethrough. The stub shaft is keyed to the rear axial end of the main shaft that extends through the interior of the cooling chamber. The short stub shaft is a distinct and separate component as compared with the main shaft. The stub shaft extends axially outboard from the rear wall of the cooling chamber. As used herein, the term "axially outboard" refers to an item that is axially disposed away from a referenced item as compared with an interior, central region in the cooling chamber. "Axially inboard" refers to items closer to the interior, central region of the chamber. The axially outboard end of the stub shaft is rotatably held by a brass bushing that is mounted in an outboard section of the plastic rear seal housing. The axially inboard end of the prior art rear seal assembly terminates in a plastic insert threadably mounted in the plastic rear seal housing. The plastic insert includes a threaded, axially inboard extension that screws into a threaded hole through the rear wall of the cooling chamber. The plastic insert has a passage therethrough that forms a bushing for the axially inboard end of the stub shaft and the axially outboard end of the main shaft. The keyed regions of both shafts are disposed in the bushing of the plastic insert. The plastic rear seal housing is sealed to the outside surface of the rear wall of the cooling chamber by an O-ring.

A commercially available shaft seal assembly is disposed in the interior of the plastic rear seal assembly. Circumferentially surrounding an axially inboard portion of the brass bushing (the other portion of the bushing being mounted in the axially outboard section of the plastic rear seal housing) is a first rubber seal ring. The first seal ring holds a bearing member having an axial end face bearing surface disposed inboard of the seal ring. The axially inboard end face is generally radially aligned with the inboard end of the brass bushing. Another axial end face bearing member is forced against the first axial bearing face by a spring. The second bearing face is part of a unit that rotates with the stub shaft. The second bearing face is held by a metal ring assembly. The ring assembly also retains a rubber seal having a coupling section sealingly mounted on a portion of the stub shaft. The metal ring assembly has two parts. The first part is adapted to move slightly axially with respect to the second part. The spring forces a portion of the metal ring assembly axially outboard thereby forcing the second bearing face against the first. The spring and the first and second bearing faces are all retained within the plastic rear seal assembly that is attached to the outside of the cooling chamber. The stub shaft is keyed to the main shaft at a position generally coplanar to the rear wall of the chamber.

Therefore in the prior art device, the mixture held within the cooling chamber is not completely sealed in the interior of the chamber because some mixture may leak through the keyed rotating shafts and the bushing in the plastic insert. The beverage would then be held inside the plastic rear seal housing. The stub shaft is sealed via the coupling section of the rubber seal held by the metal ring assembly and the two axial end face bearing surfaces.

The plastic outer housing of this prior art rear seal assembly may sometimes leak and break. The beverage trapped in the seal housing sometimes leaks out between the threads of the plastic insert and the plastic seal housing. This leakage occurred with greater frequency when the plastic threads of the insert (either cooperating with the rear chamber wall or the plastic seal housing) became worn due to repeated maintenance of the cooling chamber. Since different materials are used in the prior art device and since the temperature gradient across the end region of the main shaft and stub shaft depends somewhat on the amount of beverage that has leaked between the keyed shafts and the plastic insert bushing, the various components sometimes did not expand or contract to the same degree and hence the seal would sometimes fail. Also, the use of different materials in the seal assembly affected the life of the seal since the components would generally wear at different rates.

OBJECTS OF THE PRESENT INVENTION

It is an object of the present invention to provide a rear seal assembly wherein almost all of the sealing assembly components are disposed in the interior of the cooling chamber.

It is another object of the present invention to provide a rear seal assembly that is more compact as compared with the seal assembly that extended beyond the rear wall of the cooling chamber.

It is a further object of the present invention to provide a rear seal assembly wherein the product is isolated from the passage in the wall of the cooling chamber through which extends the shaft.

It is an additional object of the present invention to provide a rear seal assembly that utilizes the main shaft that extends through the cooling chamber rather than a shortened main shaft and a stub shaft thereby eliminating any keying problems between the main shaft and the stub shaft. These keying problems include alignment, build up of product in the key and key way, and greater torque resistance caused by the interference of product build-up in the keyed sections of the shafts with the bushing in the plastic insert.

It is a further object of the present invention to provide a rear seal assembly wherein the shaft is supported by bearings that are completely isolated from the product in the cooling chamber thereby enabling better support of the shaft and lower torque requirements to rotate the shaft due to the use of bearings rather than bushings.

It is another object of the present invention to provide a rear seal assembly wherein the effect of temperature gradient on the seal assembly is lessened since the major components are metal.

SUMMARY OF THE INVENTION

The present invention is a rear seal assembly that holds and seals a rotatable shaft extending through the cooling chamber and extending axially outboard through a rear wall in the chamber. In the interior of the cooling chamber, the seal assembly includes a first resilient seal having a coupling section fitted about the shaft and a radially protruding lip section at the base of the coupling section. Two interfitting rings are respectively mounted on the coupling section and the lip section such that the rings move slightly axially with respect to each other. One of the interfitting rings is biased axially outboard towards the axial end of the shaft which protrudes beyond the rear wall of the cooling chamber. A first member is seated in one of the interfitting rings and has a first axial end face bearing surface spaced from the shaft. A second member, also spaced from the shaft, has a second axial end face bearing surface that interfaces the first bearing surface The second member is held by a second resilient seal, which in turn is held by and sealed with a seal housing. The seal housing is metal in the preferred embodiment. The shaft passes through the second member, the second resilient seal and the seal housing. The seal housing also has an axially inboard receiving bore that holds the second resilient seal. At the axially outboard end portion of the seal housing, an axially outboard male threaded extension protrudes from a wall abutment surface of the seal housing. The outboardly extending male threaded extension of the seal housing mates with complementary threads in the hole through the rear wall of the cooling chamber. A retaining ring, that is metal in the preferred embodiment, is threaded from the outside of the chamber onto the outwardly extending male threaded extension of the seal housing. The retaining ring has a threaded outer circumference. A bearing housing, that is metal in the preferred embodiment, is threadably mounted on the retaining ring. The bearing housing holds, in a partial bore, a ball bearing assembly that holds the shaft.

BRIEF DESCRIPTION OF THE DRAWINGS

Further objects and advantages of the present invention can be found in the detailed description of the preferred embodiment when taken in conjunction with the accompanying drawings in which:

FIG. 1 illustrates an exploded view of the rear seal assembly;

DETAILED DESCRIPTION OF THE PREFERRED EMBODIMENT

Figure 2:
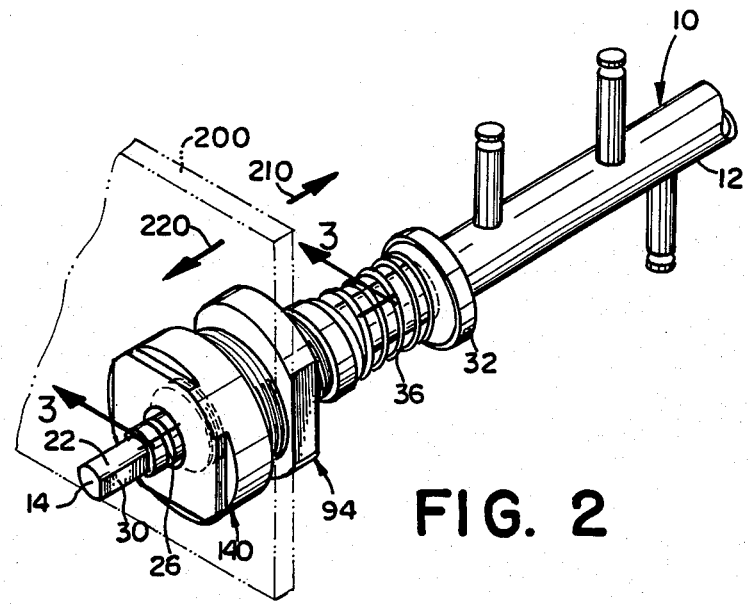
FIG. 2 illustrates an assembled rear seal.

The present invention relates to a rear seal assembly for a cooling chamber holding a partially frozen beverage.

FIG. 1 illustrates an exploded view of the rear seal assembly. Shaft 10 has an axially inboard section 12 that is disposed in the interior of the cooling chamber as described later with respect to FIG. 2. As used herein, the term "axially inboard" refers to items that are closer to or are facing section 12 of the shaft. As used herein, the term "axially outboard" refers to items that are closer to or are facing axial end 14 of shaft 10. Axial end 14 is outboard of wall 200 of the cooling chamber as show in FIG. 2. Shaft 10 includes a plurality of posts two of which are identified in FIG. 1 as posts 16 and 18. Attached to the remote end of the posts is an agitator blade (not shown) that mixes the partially frozen beverage in the interior of the cooling chamber. The shaft also includes a first shaft section 20 that has a smaller diameter as compared with the inboard shaft section 12. As described later, all of the spring seal assembly is disposed on or about shaft section 20. Further outboard of shaft section 20 is a second shaft section 24. Shaft section 24 includes a groove 26 within which is disposed a snap ring lock (not shown) that is a safety device to insure that the roller bearings do not move on the shaft. Further outboard on the shaft is a third shaft section 28 on which is disposed a pulley wheel (not shown) that rotates the shaft. The pulley wheel is keyed to shaft section 28 because of flattened land 30 on section 28. Shaft sections 20, 24 and 28 have increasingly smaller diameters.

Seal spring unit 22 is mounted on or about shaft section 20. Unit 22 includes a washer like spring stop 32 that rests against transition region 34 on the shaft as shown in FIG. 2. Coil spring 36 provides an axially outward biasing means for a first resilient seal means 38. The seal means 38 includes a first resilient seal 40 made of a rubber-like material. Seal 40 includes a coupling section 42 and a radially protruding lip section 44. Coupling section 42 extends from the base of radial section 44. At the base, a resilient region 46 permits radial lip section 44 to move slightly axially with respect to coupling section 42. Resilient seal means 38 also includes two interfitting rings 50 and 52. Preferably, the rings are metal. Interfitting ring 50 includes at an axially outboard end a seat region 54 in which sets radial lip 44 and a first member 56 that will be described hereinafter. Ring 50 also includes, radially spaced from shaft section 20, a circumferential ring section 58 that has a radially inwardly projecting lip 60 that defines an axially outboard face 62 best shown in FIG. 3 and axially inboard face 63. Interfitting ring 50 includes four axially inboard protruding legs one of which is leg 64 that protrudes from the radially inmost portion of lip 60. These legs interfit corresponding depressions on other interfitting ring 52. In other words, leg 54 interfits depression 66 in interfitting ring 52. Interfitting ring 52 includes raised lands between the depressions, one of which is land 68 spanning depression 66 and depression 70.

Figure 3:
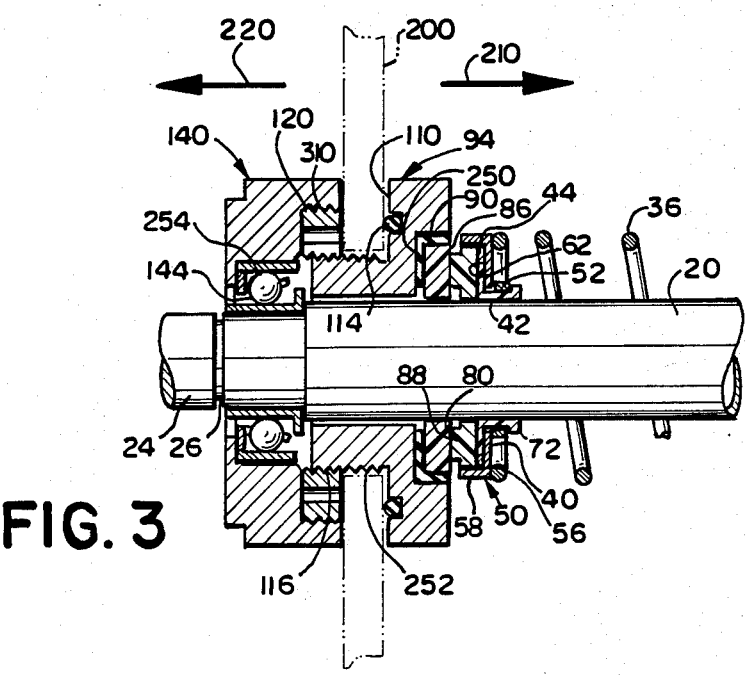
FIG. 3 illustrates a cross-sectional view of the rear seal assembly as viewed from the perspective of section lines 3'-3" in FIG. 2.

In general, resilient seal 40 fits within interfitting rings 50 and 52. Ring 52 circumferentially surrounds coupling section 42. At the axially inboard end of coupling section 42 a short lip 72 holds the axially inboard side of interfitting ring 52. This is best shown in FIG. 3. Radially protruding lip 44 of resilient seal 40 principally rests against the axially outboard face 62 of radially inwardly projecting lip portion 60 of interfitting ring 50. When seal means 38 is assembled, ring 52 is held by small radial lip 72 and ring 52 is permitted to move slightly axially with respect to interfitting ring 50 due to the resiliency of resilient region 46 of seal 40. Precisely, coupling section 42 is sealingly mounted to shaft section 20 due to the tight fit of the rubber-like material between interfitting ring 52 and the shaft surface. Interfitting ring 50, therefore, is adapted to move slightly axially with respect to ring 52 due to the biasing action of coil spring 36 acting in a direction axially outboard on lip 60 of ring 50, i.e., against axially inboard face 63. The slight axial movement may be very small or negligible when the rear seal assembly is in use.

As stated earlier, a first member 56 is disposed within seat region 54 defined by circumferential ring section 58 and radially inward lip section 60 of interfitting ring 50. Member 56 is keyed to interfitting ring 50 by small tabs 76 and 78 depending radially inward beyond the inner surface of circumferential ring section 58. These tabs interfit depressions, one of which is depression 79, on the outer circumference of member 56. Member 56 is made of a hard plastic or carbon-like material. Member 56 includes a first axial end face bearing surface 80 that is an axially protruding, flat topped land radially spaced from the surface of shaft section 20. In a preferred embodiment, member 56 is a ring that is radially spaced from the surface of shaft section 20. Member 56 rotates with the shaft due to the coupling effect of resilient seal means 38 and the interlocking of the tabs and the depressions, for example tab 78 in depression 79. Axial end face bearing surface 80 is forced against a second member 86 by the biasing effect of spring 36 acting on lip 60 of interfitting ring 50. Member 86 is made of a relatively hard plastic material and has an axially inboard bearing surface 88 that interfaces bearing surface 80 of member 56. This is best shown in FIG. 3. Bearing face 88 is in a plane normal to the axial center line of shaft 10. Member 86 is spaced away from the surface of shaft section 20 and therefore there is no friction between member 86 and the shaft. Member 86 is held by a second resilient sealing means 90. Sealing means 90 is a seal that is made of a rubber-like material. The outer circumference of seal 90 has resilient ridges, one of which is ridge 92 that cooperates with a receiving bore in seal housing 94. Receiving bore 250 is shown in FIG. 3. Preferably, seal housing 94 is metal. At the axially outboard end of seal 90 is a radially inward protruding lip 96 that defines a receiving seat for member 86 in conjunction with the axially inboard protruding section 98 of seal 90.

Seal spring unit 22 is utilized in the prior art rear seal assembly but the entire spring unit is assembled on a stub shaft and the stub shaft and the spring unit is entirely enclosed in a plastic housing that is completely outside of the cooling chamber, that is, axially outboard of the rear wall of the cooling chamber.

Seal housing 94 includes a receiving bore (bore 250 in FIG. 3) at its axially inboard side which receives seal 90 as well as member 86. Seal housing 94 includes an axially outboard wall abutment surface 110 that abuts the interior of the rear wall of the cooling chamber. Surface 110 includes a circumferential groove 112 within which is disposed O-ring 114. O-ring 114 serves to further seal the interior of the cooling chamber. Seal 94 also includes an axially outboard male threaded extension 116. Seal housing 94 includes bore 118 through which passes shaft section 20 of shaft 10. The radially inner surface of seal housing 94, defining bore 118, is spaced away from shaft 20. Male threaded extension 116 is threaded onto female threads on the hole through the rear wall of the cooling chamber. Also, male threaded section 116 is threadably attached to retaining ring 120. Ring 120 is preferably metal and has a threaded inner through bore 122 and a threaded outer circumference 124. The axially inboard face 126 of retaining ring 120 abuts the exterior surface of the rear wall of the cooling chamber and hence is an axially inboard wall abutment face. Retaining ring 120 includes a pair of bores one of which is bore 130. A tool is placed in these bores such that the retaining ring can be securely screwed onto outboard extension 116 of seal housing 94 thereby mounting the rear seal assembly to the wall.

A bearing housing 140 includes a rolling bearing assembly 144. The rolling bearing assembly 144 includes an inner assembly surface that is mounted onto shaft section 24 of shaft 10. Bearing housing 140 is preferably metal.

FIG. 2 shows an assembled rear seal assembly and FIG. 3 shows a partial, cross-sectional view of the assembled assembly as viewed from the perspective of section lines 3'-3". Both FIGS. 2 and 3 will be referred to concurrently herein. The cooling chamber has a rear wall 200. Arrow 210 designates items in the interior of the cooling chamber and arrow 220 designates items outside of the cooling chamber. Therefore, most of the rear seal assembly is disposed in the interior of the cooling chamber. FIG. 3 shows coupling section 42 of resilient seal 40 surrounding and sealing shaft section 20. This is principally due to the inside diameter of coupling section 42 and the radially inward forces generated by interfitting ring 52. Interfitting ring 50 is forced axially outboard or to the left of FIG. 3 by the biasing action of spring 36. This forces member 56 to bear against member 88. Axially inboard bearing surface 88 of member 86 interfaces with axially outboard bearing surface 80 of member 56. Members 56 and 86 are spaced away from the surface of shaft section 20 as is seal housing 94. FIG. 3 shows seal housing 94 having an axially inboard receiving bore 250 that holds seal 90 and most importantly, member 86. O-ring 114 in wall abutment surface 110 of seal housing 94 provides the third seal that seals the beverage in the interior of the cooling chamber or to the left of wall 200 in FIG. 3. Therefore, the beverage is sealed from the shaft at all points axially outboard of coupling section 42 of seal 40 due to the sealing action coupling section 42, the sealing action of members 56 and 86, the sealing action of seal 9 between member 86 and housing 94 and the sealing action of O-ring 114 between wall 200 and housing 94. Since there is no beverage leaking beyond coupling section 42 and affecting bearing 144, the present rear seal assembly is more compact and provides a better rotational support for the shaft with respect to rear wall 200. Further, the beverage cannot adversely affect the rotational movement as with the prior art rear seal assembly.

As compared with the prior art rear seal assembly, the present invention does not have a stub shaft keyed to the main shaft nor does it utilize bushings as does the prior art device. As stated earlier, the prior art rear seal assembly is attached on the exterior of the wall and there existed a possibility that the beverage would flow between the plastic insert bushing and the keyed regions of the two shafts. This leakage was then sealed in the prior art rear seal housing exterior to the wall. In the present invention, the beverage is sealed in the interior of the chamber. Further, the temperature gradient across the present invention is more uniform as compared with the prior art rear seal. In the event beverage did leak into the prior art rear seal assembly, the liquid beverage would affect the temperature gradient throughout that seal assembly and therefore affect the performance of the seal assembly.

The present invention provides better rotational support for the shaft since roller bearing 144 is closer to the rear wall as compared with the prior art rear seal assembly. Also, the present invention eliminates the use of a stub shaft.

As shown in FIG. 3, wall 200 has a hole therethrough through which passes the shaft. The hole has female threads 252 that mate with male threaded extension 116 of seal housing 94. Bearing housing 140 includes an axially inboard bore 254 that receives bearing 144. Bearing 144 is mounted within bearing housing 140 by an interference fit between the radially outside surface of the bearing assembly and the outer circumference of receiving bore 254 of bearing housing 140. Bearing housing 140 also includes a larger partial bore 310 that has threads complementary to the outer circumferential threads of retaining ring 120. The housing is threadably attached to the ring and therefore the axially inboard face of housing 140 abuts the exterior of wall 200. This further secures the seal assembly to the cooling chamber. As a safety measure, a snap ring (not shown) is placed in groove 26 on shaft section 24 which prohibits the movement bearing assembly 144.

The claims appended hereto are meant to cover modifications and changes within the scope and spirit of the invention.

What is claimed is:

1. A seal assembly for a rotatable shaft having an axial end passing through a wall comprising:
    a first resilient seal means for sealing, fitted onto said shaft, said first seal means including a circumferentially disposed, slightly axially movable portion;
    means for axially biasing said movable portion outboard towards said axial end of said shaft;
    a first member fitted on said first seal means and having a first, axial end face, bearing surface spaced from said shaft;
    a second member spaced from said shaft and having a second, axial end face, bearing surface that interfaces with said first bearing surface;
    a seal housing having a passage therethrough for said shaft, an axially outboard male threaded extension, an axially outboard wall abutment surface at the base of said extension, and an axially inboard receiving bore;
    a second resilient sealing means, disposed within said receiving bore, for holding said second member and for sealing said second member with respect to said seal housing;
    a retaining ring having a threaded outer circumference and a threaded through bore that is complementary to said male threaded extension of said seal housing, and having an axially inboard wall abutment face; and
    a bearing housing within which is disposed a bearing assembly having an inner assembly surface adapted to be mounted onto said shaft, said bearing housing having an axially inboard bore with a threaded bore surface complementary to said threaded outer circumference of said retaining ring.

2. A seal assembly as claimed in claim 1 wherein said axially inboard receiving bore of said seal housing has a depth substantially equal to the combined thickness of said second resilient sealing means and said second member such that said second bearing surface is substantially flush with an axially inboard end face of said housing.

3. A seal assembly as claimed in claim 1 wherein said axially outboard wall abutment surface of said seal housing has a circular groove and the seal assembly further includes an O-ring disposed in said groove.

4. A seal assembly as claimed in claim 1 wherein said wall defines a shaft passage larger than said shaft and said shaft passage defines threads are complementary to said axially outboard threaded extension of said seal housing.

5. A seal assembly as claimed in claim 1 wherein said bearing assembly is a ball bearing assembly.

6. A seal assembly as claimed in claim 1 wherein said bearing housing includes a further axially inboard bore and said bearing assembly is mounted therein by an interference fit.

7. A seal assembly as claimed in claim 1 wherein said shaft has a first shaft section upon which is mounted said first resilient seal means, and said first shaft section passes through said means for axially biasing, said first member, said second member, said seal housing and said second resilient sealing means.

8. A seal assembly as claimed in claim 7 wherein said shaft has a second shaft section axially outboard of said first shaft section upon which is mounted said bearing assembly and said second shaft section passes through said retaining ring and said bearing housing.

9. A seal assembly as claimed in claim 7 wherein said first shaft section has a smaller diameter as compared with an inboard section of said shaft, and said means for axially biasing includes a spring stop abutting a transition zone between said first shaft section and said inboard shaft section and includes a coil spring through which passes said first shaft section, a first axial end of said coil spring abutting said spring stop and a second axial end of said spring abutting said movable portion of said first resilient seal means.

10. A seal assembly as claimed in claim 1 wherein said first member is a first ring-shaped member through which passes said shaft, said first seal means includes:
    a first resilient seal having a coupling section fitted about said shaft and a radially protruding lip section at the base of said coupling section; and
    two interfitting rings, a first of said interfitting rings mounted on said coupling section and a second of said interfitting rings mounted over said lip section and defining, in conjunction with said lip section, said circumferentially disposed, slightly axially movable portion such that said second interfitting ring is adapted to move slightly axially with respect to said first interfitting ring;
    said means for axially biasing acting upon said second interfitting ring.

11. A seal assembly as claimed in claim 10 wherein said second interfitting ring defines an axially outboard seat region and said first member is seated within said seat region.

12. A seal assembly as claimed in claim 11 wherein said seat region is keyed to said first member such that said first member rotates with said shaft due to the coupling thereof via said two interfitting rings and said first resilient seal.

13. A seal assembly as claimed in claim 1 wherein said first bearing surface is an axially protruding land which is radially spaced from said shaft.

14. A seal assembly as claimed in claim 13 wherein said second bearing surface is larger than said land of said first bearing surface.

15. A seal assembly as claimed in claim 1 wherein said seal housing, said retaining ring and said bearing housing are made of metal.

* * * * *